United States Patent [19]

Wall

[11] Patent Number: 4,878,730
[45] Date of Patent: Nov. 7, 1989

[54] FIBER OPTIC ATTENUATOR

[75] Inventor: Stephen W. Wall, Costa Mesa, Calif.

[73] Assignee: Hughes Aircraft Company, Los Angeles, Calif.

[21] Appl. No.: 264,426

[22] Filed: Oct. 31, 1988

[51] Int. Cl.$^4$ .............................................. G02B 6/38
[52] U.S. Cl. .................................. 350/96.21; 350/96.2
[58] Field of Search ................ 350/96.2, 96.21, 96.22

[56] References Cited

U.S. PATENT DOCUMENTS

| 4,130,344 | 12/1978 | Lemonde | 350/96.21 |
| 4,279,467 | 7/1981 | Borsuk et al. | 350/96.21 |
| 4,753,510 | 6/1988 | Sezerman | 350/96.21 |

FOREIGN PATENT DOCUMENTS

| 52-25647 | 2/1977 | Japan | 350/96.21 |
| 56-138706 | 10/1981 | Japan | 350/96.21 |
| 60-216316 | 10/1985 | Japan | 350/96.21 |

OTHER PUBLICATIONS

Optical Variable Attenuator, Anritsu, pp. 94-99.
Fiber Optic Attenuator Series, Photodyne, Inc., pp. 60-66.

Primary Examiner—William L. Sikes
Assistant Examiner—John Ngo
Attorney, Agent, or Firm—Joseph E. Szabo; Wanda K. Denson-Low

[57] ABSTRACT

A fiber optic attenuator (11) comprising fiber optic termini (13, 13a) having bodies (23, 23a), with end faces (27, 27a) and optical fibers (29, 29a). The optical fibers (29, 29a) have distal ends (31, 31a) adjacent the end faces (27, 27a). A connector in the form of an alignment sleeve (15), a housing (17) and a coupling (19) connects the termini (13, 13a) with the end faces (27, 27a) in confronting relationship, and the distal ends (31, 31a) optically coupled. A screw (21) carried by the housing (17) can relatively displace the distal ends (31, 31a) in a generally radial direction to provide attenuation of the optical signal transmitted between the termini (13, 13a).

9 Claims, 2 Drawing Sheets

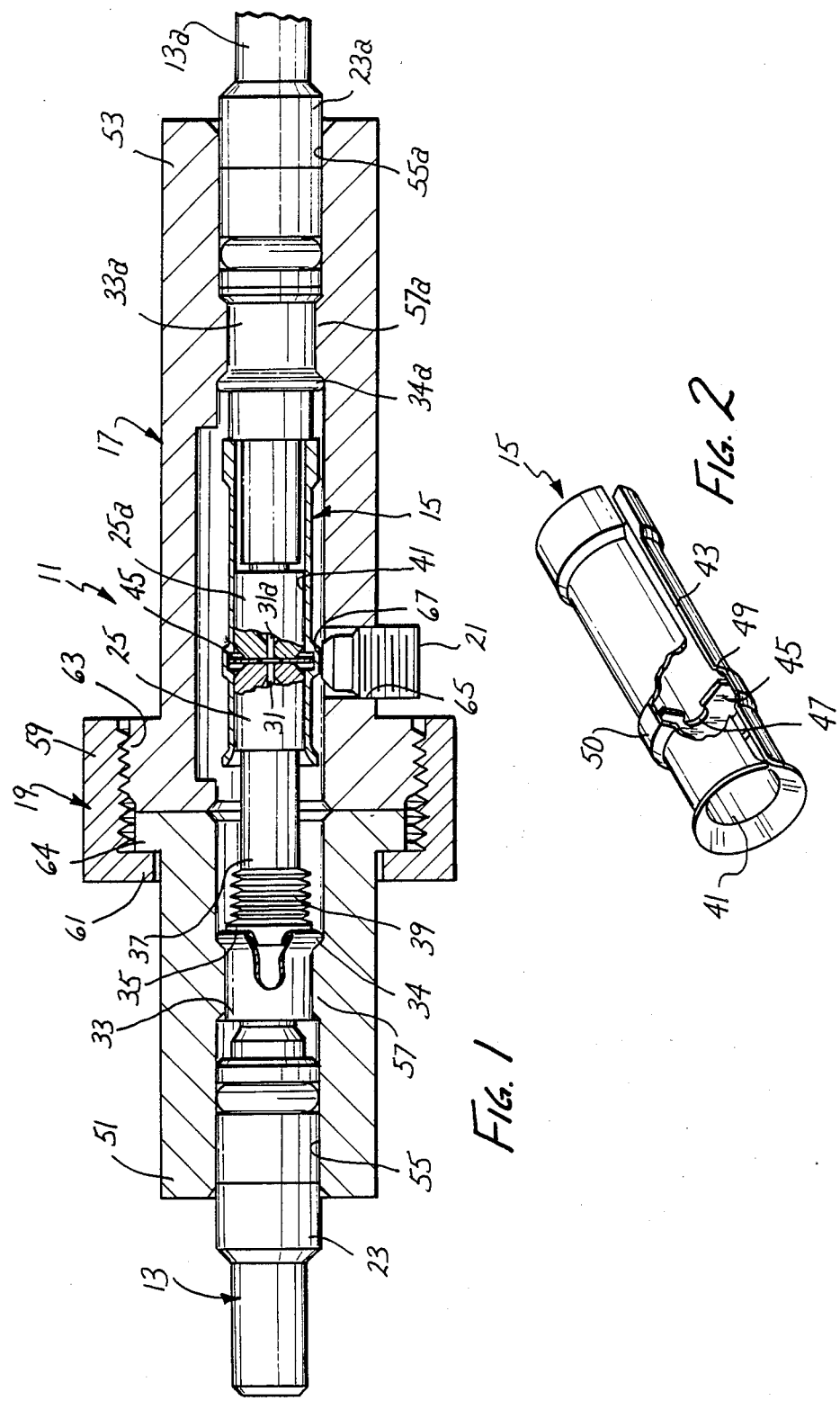

FIBER OPTIC ATTENUATOR

BACKGROUND OF THE INVENTION

1. Field of the Invention

This invention relates to an apparatus for attenuating the optical signal transmitted between fiber optic termini.

2. Description of the Related Art

In many cases, it is desirable to couple fiber optic termini in a way that will minimize the optical losses resulting from the connection. In other instances, it is desirable to attenuate the optical power at a fiber optic interconnection. Attenuation of the optical power may be desirable, for example, to reduce the power received by a detector to a level that improves the performance of the detector.

One kind of prior art fiber optic attenuator employs optical components, such as lenses and filters of different densities to optically attenuate the power transmitted at the fiber optic interconnection. Mechanical attenuators are also known in which shims or spacers are used to increase the axial spacing between the interconnected optical fibers. Both of these kinds of attenuators are more complex than is desired, and the optical attenuators are relatively expensive. Accordingly, there is a need for a simple, reliable, inexpensive fiber optic attenuator.

SUMMARY OF THE INVENTION

This invention provides a fiber optic attenuator of simple, inexpensive construction. Simplicity is enhanced and cost is reduced because the attenuator may include several standard components. Although the attenuator includes some additional components, these components are of simple construction and relatively inexpensive.

One feature of this invention is that attenuation is achieved by relatively displacing the distal ends of the interconnected optical fibers in a generally radial direction. This eliminates the spacers of the prior art mechanical attenuator and provides for infinite, rather than stepwise, attenuation. In addition, the radial displacement can be easily accomplished from the exterior of the attenuator.

Another important characteristic of this invention is that the degree of attenuation is easily repeatable. For example, the distal ends of the optical fibers can be relatively radially displaced to achieve a predetermined degree of attenuation. When the displacing force is removed, the distal ends of the optical fibers automatically return to their initial, pre-attenuated position.

A fiber optic attenuator constructed in accordance with this invention may include first and second fiber optic termini, each of which has a body with an end face and an optical fiber carried by the body. The optical fiber has a distal end adjacent the end face. The attenuator also includes connector means for connecting the fiber optic termini with the end faces in confronting relationship, and the distal ends of the optical fibers optically coupled so that an optical signal can be transmitted from one of the termini to the other. The attenuator also includes means for relatively displacing the distal ends in a generally radial direction to introduce radial misalignment to the optical fibers and attenuate the optical signal.

In a preferred construction, the connector means includes means for resiliently holding the distal ends of the optical fibers in a predetermined optically coupled relationship, and the displacing means displaces the distal ends from the predetermined relationship to attenuate the optical signal. To simplify construction and to reduce cost, the holding means can advantageously include a conventional slotted alignment sleeve which receives portions of the bodies of the first and second termini. The slotted alignment sleeve or other resilient holding means resiliently urges the distal ends toward the predetermined optically coupled relationship so that, when the displacing action of the displacing means is removed, the distal ends are urged toward the predetermined optically coupled relationship.

The relative radial displacement of the distal ends of the optical fibers may be pure radial movement. However, preferably, the displacing means pivots at least one of the optical fibers to displace the distal ends thereof in a generally radial direction.

The connecting means also preferably includes a housing which at least partially receives the first and second fiber optic termini and the alignment sleeve. The displacing means preferably includes a movable member carried by the housing. For simplicity and to reduce cost, the movable member can take the form of a screw threaded into the housing. The screw preferably moves radially and is engageable with the alignment sleeve adjacent the interface between the first and second termini.

By rotating the screw, it can be caused to forceably bear against the alignment sleeve, which resiliently yields to allow slight rotation of the termini and the associated optical fibers. This creates some angular misalignment between the optical fibers to attenuate the optical power at the interconnection.

The invention, together with additional features and advantages thereof, may best be understood by reference to the following description taken in connection with the accompanying illustrative drawing.

BRIEF DESCRIPTION OF THE DRAWING

In the accompanying drawings:

FIG. 1 is a sectional view of one preferred form of fiber optic attenuator constructed in accordance with the teachings of this invention.

FIG. 2 is an isometric view of the alignment sleeve.

DESCRIPTION OF THE PREFERRED EMBODIMENT

Figure 3:
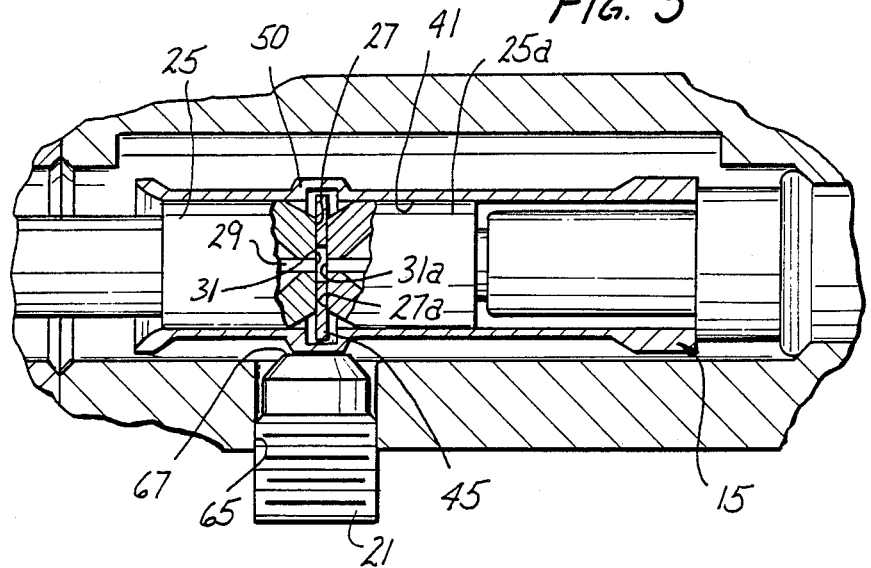
FIG. 3 is an enlarged, fragmentary, sectional view of a central portion of the attenuator, with the end faces of the optical fibers being in a first optically coupled position.

Referring now to the drawings in more detail, FIG. 1 shows a fiber optic attenuator 11 which generally includes fiber optic termini 13 and 13a, an alignment sleeve 15, a housing 17, a coupling 19, and a displacement member in the form of a screw 21. Simplification and cost reduction are achieved, in part, because the termini 13 and 13a and the alignment sleeve 15 may be of conventional construction.

In this embodiment, the termini 13 and 13a are of conventional construction and are of the type available from the assignee of record. The terminus 13 is a standard pin terminus, and the terminus 13a is a standard socket terminus. Except to the extent shown or described herein, the termini 13 and 13a are identical, and portions of the terminus 13a corresponding to portions of the terminus 13 are designated by corresponding reference numerals followed by the letter "a." If desired, the terminus 13a may also be a pin terminus and be completely identical to the terminus 13.

The terminus includes a body 23, and the body includes a bushing 25 having an end face 27 (FIG. 3). The terminus 13 also has an optical fiber 29 carried by the body and having a distal end 31 adjacent, and in this embodiment, coplanar with, the end face 27.

The terminus 13 has a slotted retainer 33 with an annular shoulder 34 slidable axially on the body 23, a movable spring retainer 35 which is also slidable on the body 23, a fixed spring retainer 37 and belleville springs 39 between the retainers 35 and 37. The terminus 13a is identical, except that it does not have the springs 39 and the retainers 35 and 37.

In this embodiment, the alignment sleeve 15 is also a conventional component available from the assignee of record. As shown in FIG. 2, the alignment sleeve 15 is in the form of a cylindrical tube having an axial cylindrical passage 41 extending through it, an axially extending slot 43 extending for the full length of the tube, and a floating spacer 45 having an axial opening 47 and retained by an internal groove 49 formed by a rib 50 of the tube. The alignment sleeve 15 is constructed of metal and is somewhat resilient because of the presence of the slot 43. As shown in FIGS. 1 and 3, the bushings 25 and 25a are received within the passage 41, and the alignment sleeve holds the bushings, with the end faces 27 and 27a in confronting relationship, and the distal ends 31 and 31a in axial alignment so that an optical signal can be transmitted from one of the termini to the other. This may be considered a predetermined optically coupled relationship or a first optically coupled position.

Although the housing 17 can be of different constructions, in this embodiment it includes housing sections 51 and 53, which are axially coupled together by the coupling 19. The housing sections 51 and 53 have axial passages 55 and 55a for receiving the termini 13 and 13a, respectively, and annular ribs 57 and 57a for cooperation with the slotted retainers 33 and 33a, respectively, to retain the termini in the housing 17 in a conventional manner. Specifically, the slotted retainers 33 and 33a lie within the portion of the passages 55 and 55a defined by the ribs 57 and 57a, with the annular shoulder 34 engaging one end of the associated rib. As the termini 13 and 13a are drawn together by the coupling 19 as described below, the spring 39 is compressed between the fixed retainer 37 and the movable retainer 35, which engages the movable slotted retainer 33, to thereby resiliently load the terminus 13 to the right as viewed in FIG. 1 tightly against the end face 27a. This force acting on the end face 27a acts to urge the rib 34a of the slotted retainer 33a against the rib 57a to hold the terminus 13 firmly within the housing 17. This is a conventional way of mounting termini of this type within a housing.

The coupling 19 can be of any suitable construction for releasably retaining the housing sections 51 and 53 together. In this embodiment, the coupling 19 includes an internally threaded member 59 rotatably mounted on the housing section 51 in any suitable manner, such as by an annular flange 61, and an externally threaded portion 63 on the housing section 53. The coupling 19 also includes an annular flange 64 on the housing section 51 which is engageable with the flange 61. By rotating the internally threaded member 59, the housing sections 51 and 53 can be connected and disconnected as desired.

The screw 21 is carried by the housing section 53 in an internally threaded radial bore 65. The screw 21 has a planar inner end 67, external threads which cooperate with the threads of the bore 65 so that it can be moved radially with respect to the termini 13 and 13a and the passage 55a. In this embodiment, the central axis of the screw 21 lies in a radial plane and passes approximately through the interface between the end faces 27 and 27a.

Figure 4:
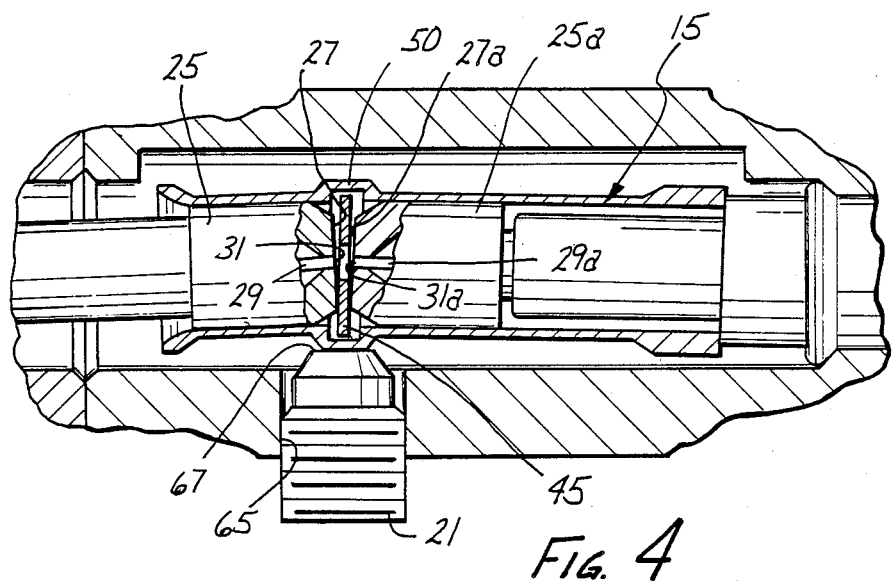
FIG. 4 is a fragmentary, sectional view similar to FIG. 3, with the distal ends of the optical fibers being urged to a second optically coupled position in which the optical power being transmitted is attenuated.

With the attenuator 11 in the position of FIGS. 1 and 3, the housing 17 and the alignment sleeve 15 accurately retain the distal ends 31 and 31a of the optical fibers 29 and 29a in good axial alignment so that there is only minimal loss of the optical signal at the interface. The floating spacer 45 slightly spaces the end faces 27 and 27a and the distal ends 31 and 31a, with the opening 47 being aligned with the distal ends 31 and 31a. If optical power attenuation is desired, it is only necessary to rotate the screw 21 to, for example, the position of FIG. 4 in which the inner end 67 of the screw bears against the rib 50 of the alignment sleeve 15 to urge the bushings 25 and 25a and the optical fibers 29 and 29a to the position of FIG. 4. In doing this, the screw 21 applies a radial force to the alignment sleeve 15 to pivot the termini 13 and 13a generally about radially extending axes so as to achieve some angular misalignment of the distal ends 31 and 31a as shown in FIG. 4. This pivotal movement is about axes displaced axially outwardly from the distal ends 31 and 31a so that there is some slight radial movement of the distal ends.

Because the alignment sleeve 15 is resilient, it tends to resiliently retain the distal ends 31 and 31a in the predetermined optically coupled relationship or the first optically coupled position of FIG. 3. The alignment sleeve 15 resiliently yields to provide the angular misalignment and attenuation of the optical signal. If the screw 21 is counterrotated to the position of FIGS. 1 and 3, the displacing action of the screw is removed, and the resilient nature of the alignment sleeve 15 urges the distal ends 31 and 31a toward the first optically coupled position of FIG. 3. Preferably, this resilient action is sufficient to quite accurately return the distal ends 31 and 31a to the first optically coupled position. Accordingly, the attenuation can be simply and easily applied and removed. Also, by appropriately calibrating the attenuator 11, a particular angular position of the screw 21 can be made to correspond with a particular degree of attenuation of the optical power. Because the alignment sleeve tends to return the distal ends 31 and 31a to the first optically coupled position, the attenuator can be used repeatedly, and it can be calibrated as noted above.

Although an exemplary embodiment of the invention has been shown and described, many changes, modifications and substitutions may be made by one having ordinary skill in the art without necessarily departing from the spirit and scope of this invention.

What is claimed is:
1. A fiber optic attenuator comprising:
   first and second fiber optic termini, each of said termini including a body with an end face and an optical fiber carried by the body, each of the optical fibers having a distal end adjacent the end face;

connector means for connecting the fiber optic termini with the end faces in confronting relationship and the distal ends of the optical fibers optically coupled so that an optical signal can be transmitted from one of the termini to the other; and means for relatively displacing said distal ends in a generally radial direction from a first optically coupled position to a second optically coupled position, to introduce radial misalignment to the optical fibers and attenuate the optical signal, said connector means including resilient means for urging the distal ends from the second optically coupled position toward the first optically coupled position whereby, when the displacing action of the displacing means is removed, the resilient means urges the distal ends toward the first optically coupled position.

2. An attenuator as defined in claim 1 wherein the connector means includes means for resiliently holding the distal ends of the optical fibers in a predetermined optically coupled relationship and said displacing means displaces said distal ends from said predetermined relationship to attenuate the optical signal.

3. An attenuator as defined in claim 2 wherein the holding means includes a slotted alignment sleeve which receives portions of the bodies of the first and second termini.

4. An attenuator as defined in claim 1 wherein said displacing means pivots at least one of the optical fibers to displace the distal end thereof in a generally radial direction.

5. An attenuator as defined in claim 1 wherein said connecting means includes a housing at least partly receiving the first and second fiber optic termini and said displacing means includes a movable member carried by said housing.

6. An attenuator as defined in claim 5 wherein said movable member includes a screw threaded into said housing.

7. An attenuator as defined in claim 5 wherein the connecting means includes a slotted alignment sleeve which receives portions of the bodies of the first and second termini, and said alignment sleeve is within said housing.

8. A fiber optic attenuator comprising:

first and second fiber optic termini, each of said termini including a body with an end face and an optical fiber carried by the body, each of the optical fibers having a distal end adjacent the end face;

a slotted, resilient alignment sleeve which receives portions of the bodies of the first and second termini whereby there is an interface between the first and second termini;

a housing at least partly receiving the first and second fiber optic termini and the alignment sleeve; and means carried by said housing for displacing the distal ends of the optical fibers from a first optically coupled position to a second optically coupled position by applying a generally radial force to the alignment sleeve adjacent the interface sufficient to bend said alignment sleeve, said alignment sleeve being operative to urge the distal ends from the second optically coupled position toward the first optically coupled position when the radial force is removed from said alignment sleeve.

9. An attenuator as defined in claim 8 wherein the force applying means includes a screw threaded into said housing and movable radially, said screw being engageable with said alignment sleeve.

* * * * *